(12) United States Patent
Wachs (10) Patent No.: US 9,880,550 B2
(45) Date of Patent: Jan. 30, 2018

(54) UPDATING OF A RECIPE FOR EVALUATING A MANUFACTURING STAGE OF AN ELECTRICAL CIRCUIT

(71) Applicant: APPLIED MATERIALS ISRAEL LTD., Rehovot (IL)

(72) Inventor: Amir Wachs, Caesarea (IL)

(73) Assignee: APPLIED MATERIALS ISRAEL LTD., Rehovot (IL)

( * ) Notice: Subject to any disclaimer, the term of this patent is extended or adjusted under 35 U.S.C. 154(b) by 342 days.

(21) Appl. No.: 14/667,086

(22) Filed: Mar. 24, 2015

(65) Prior Publication Data
US 2016/0282856 A1 Sep. 29, 2016

(51) Int. Cl.
*G05B 19/418* (2006.01)

(52) U.S. Cl.
CPC ........... *G05B 19/41875* (2013.01); *G05B 2219/31443* (2013.01); *G05B 2219/45031* (2013.01); *Y02P 90/14* (2015.11); *Y02P 90/20* (2015.11); *Y02P 90/22* (2015.11)

(58) Field of Classification Search
CPC .............. G06T 2207/301; G06T 7/001; G05B 2219/31443; G05B 2219/45031; G05B 19/41865; G05B 19/41875
USPC ........... 700/95, 103, 110; 382/145, 147, 149
See application file for complete search history.

(56) References Cited

U.S. PATENT DOCUMENTS

| | | |
|---|---|---|
| 7,284,213 B2 * | 10/2007 | Fure .................. G01R 31/31718 716/136 |
| 7,570,796 B2 * | 8/2009 | Zafar ........................ G03F 1/84 382/144 |
| 7,760,929 B2 | 7/2010 | Orbon et al. |
| 8,000,519 B1 | 8/2011 | Zheng et al. |
| 8,126,255 B2 | 2/2012 | Bhaskar et al. |
| 8,664,596 B2 | 3/2014 | Zhao |
| 9,400,865 B2 | 7/2016 | Kekare |
| 9,613,411 B2 * | 4/2017 | Konuru ................. G06T 7/0004 |

(Continued)

OTHER PUBLICATIONS

Di Palma, F. & De Nicolao, G., "Process Diagnosis via Electrical-Wafer-Sorting Maps Classification", *Proceedings of the Fifth IEEE International Conference on Data Mining (ICDM'05)*, IEEE Computer Society 2005, 4 pages.

(Continued)

*Primary Examiner* — Chun Cao
(74) *Attorney, Agent, or Firm* — Kilpatrick Townsend & Stockton LLP (57) ABSTRACT

A computerized system that may include a recipe module and a yield diagnostics module. The yield diagnostics module may be configured to generate evaluation results that are indicative of an outcome of an evaluation process of at least one manufacturing stage of at least one electrical circuit. The evaluation results differ from end of line (EOL) results. The recipe module may be configured to receive EOL results relating to the at least one electrical circuit, to receive the evaluation results relating to the at least one electrical circuit; to correlate the evaluation results and the EOL results to provide correlation results; and respond to the correlation results. The responding to the correlation results may include determining whether to alter a recipe in response to the correlation results and altering the recipe if it is determined to alter the recipe.

15 Claims, 9 Drawing Sheets

(56) References Cited

U.S. PATENT DOCUMENTS

| | | | |
|---|---|---|---|
| 2009/0003684 A1* | 1/2009 | Alqudah | H01L 21/67288 382/149 |
| 2009/0080759 A1* | 3/2009 | Bhaskar | G06T 7/001 382/141 |
| 2009/0137068 A1* | 5/2009 | Rosen-Zvi | G05B 19/41875 438/14 |

OTHER PUBLICATIONS

Di Palma, F. & De Nicolao, G., "ACID: Automatic Sort-Map Classification for Interactive Process Diagnosis", *IEEE Design & Test of Computers*, Jul.-Aug. 2007, pp. 352-361.

Ke, et al., "Design Based Inspection Methodology and Application in the Fab", IEEE, Semiconductor Technology International Conference (CSTIC), 2015 China, 2015, 3 pages.

\* cited by examiner

UPDATING OF A RECIPE FOR EVALUATING A MANUFACTURING STAGE OF AN ELECTRICAL CIRCUIT

BACKGROUND

Various electrical circuits that include microscopic (micron-nanometric order) structural elements such as semiconductor wafers (wafers), dies of wafers, printed circuit boards, solar panels and microelectromechanical (MEMS) devices are manufactured by manufacturing processes that are highly complex and expensive.

Manufacturing process errors may result in defects.

Defect detection is usually performed by applying an inspection process that may be followed by a review process. The inspection process is executed by an inspection system that follows a recipe. The review process is executed by a review system that follows a recipe.

Due to manufacturing process variations and other factors a recipe that was once optimized may become non-optimized and its application may result in an increase in false detections and/or missed defects.

There is a growing need to find a method for updating recipes.

SUMMARY

According to an embodiment of the invention there may be provided a computerized system that may include a recipe module and a yield diagnostics module. The yield diagnostics module may be configured to generate evaluation results that are indicative of an outcome of an evaluation process of at least one manufacturing stage of at least one electrical circuit. The evaluation results differ from end of line (EOL) results. The recipe module may be configured to receive EOL results relating to the at least one electrical circuit, to receive the evaluation results relating to the at least one electrical circuit; to correlate the evaluation results and the EOL results to provide correlation results; and respond to the correlation results. The responding to the correlation results may include determining whether to alter a recipe in response to the correlation results and altering the recipe if it is determined to alter the recipe.

According to an embodiment of the invention there may be provided a method for evaluating a recipe, the method is executed by a computerized system and may include generating or receiving evaluation results that are indicative of an outcome of an evaluation process of at least one manufacturing stage of at least one electrical circuit; wherein the evaluation results differ from end of line (EOL) results; receiving or generating EOL results relating to the at least one electrical circuit; correlating the evaluation results and the EOL results to provide correlation results; and responding to the correlation results; wherein the responding comprises determining whether to alter the recipe in response to the correlation results and altering the recipe if it is determined to alter the recipe.

According to an embodiment of the invention there may be provided a non-transitory computer readable medium that stores instructions that once executed by a computerized system cause the computerized system to execute the stages of: generating or receiving evaluation results that are indicative of an outcome of an evaluation process of at least one manufacturing stage of at least one electrical circuit; wherein the evaluation results differ from end of line (EOL) results; receiving or generating EOL results relating to the at least one electrical circuit; correlating the evaluation results and the EOL results to provide correlation results; and responding to the correlation results; wherein the responding comprises determining whether to alter a recipe in response to the correlation results and altering the recipe if it is determined to alter the recipe.

The correlating may include categorizing defects to one of the following categories: detected fault-causing defect, non-fault-causing defects and undetected fault-causing defects.

The categorizing may be followed by altering the recipe in response to the categorizing of defects.

The categorizing may be followed by altering the recipe to include an evaluation of locations that correspond to locations of undetected fault causing defects.

The categorizing may be followed by altering the recipe to include an evaluation of locations that correspond to locations of detected fault causing defect.

The categorizing may be followed by adding to the recipe of a scanning electron microscopy review of locations that correspond to locations of at least one category of defect.

The method may include adding to the recipe a hot spot inspection.

The method may include retrieving design data about the electrical circuit and evaluating the correlation results in response to the design data.

The non-transitory computer readable medium may store instructions for adding to the recipe a hot spot inspection.

The non-transitory computer readable medium may store instructions for retrieving design data about the electrical circuit and evaluating the correlation results in response to the design data.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

There is provided a method for updating a recipe, wherein the updating is responsive to the results of end of line (EOL) tests.

The method may be executed by a computerized system. The computerized system may be separated from or integrated with an inspection or review system that obtains inspection or review results.

The terms "defects" and "suspected defects" are used in an interchangeable manner.

The terms "recipe" and "evaluation recipe" are used in an interchangeable manner.

The term "module" refers to a non-transitory component of the computerized system. Non-limiting examples of a module may include a processor, a hardware accelerator, a computer, a controller and the like. A module can execute instructions, code, software, firmware, middleware and the like.

Figure 1:
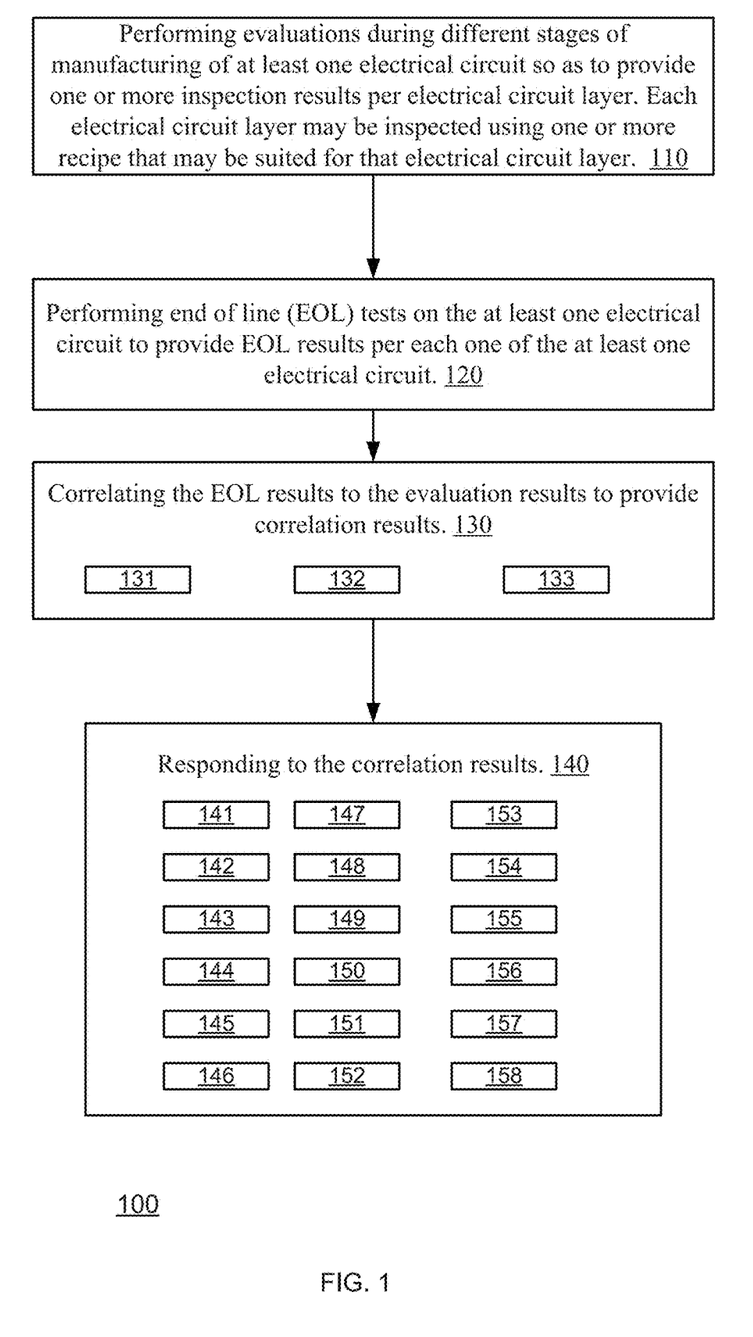
FIG. 1 illustrates a method according to an embodiment of the invention.

FIG. 1 illustrates method 100 according to an embodiment of the invention.

Method 100 starts by stage 110 of evaluating at least one electrical circuit during a manufacturing process of the at least one electrical circuit. The evaluation may occur before a completion of the manufacturing processes of the at least one electrical circuit. The evaluating does not include end of line tests of the at least one electrical circuit.

The at least one electrical circuit may include electrical circuits from the same lot, from multiple lots, electrical circuit manufactured during the same time period or during different time periods. The at least one electrical circuit may form a sufficient population of electrical circuits. For example, 3 electrical circuits out of 20 lots may be evaluated.

The evaluating may include performing at least one out of electrical circuit inspection, defect review and metrology. The inspection may be performed by an inspection system such as an optical or charged particle beam inspection system. The defect review may be performed by review system such as a charged particle microscopes and especially a scanning electron microscope (SEM). The metrology may be performed by critical dimension (CD) SEM or by other metrology systems.

Each electrical circuit (of the at least one electrical circuit) is evaluated by applying different recipes to provide multiple evaluation results per electrical circuit.

The different recipes may differ from each by one or more setup parameter such as an illumination parameter, a collection parameter, a processing parameter and the like.

Non-limiting examples of such parameters may include sensitivity, amount of filtering applied on detection signals, type of filtering, false alarm ratio, and the like.

At least some of the recipes may include operating an evaluation system at a high sensitivity and while applying minor filtering.

The outcome of stage 110 may include evaluation results. The evaluation results may include, for example, suspected defects maps (in case of electrical circuit inspection) and/or defects map (in case of defect review). Each defect or suspected defect may be associated with one or more attributes such as location, shape, size, certainty, criticality and the like.

Stage 110 may include performing inspections during different stages of manufacturing of the electrical circuit so as to provide one or more inspection results per electrical circuit layer. Different manufacturing stages are usually associated with different layers of the electrical circuits.

Each electrical circuit layer may be inspected using one or more recipe that may be suited for that electrical circuit layer. For example, evaluation results may be provided for one or more metal layers, for one or more via layers, for a contact layer, for a gate layer, for an STI layer and the like.

Stage 110 may be followed by stage 120 of performing end of line (EOL) tests on the at least one electrical circuit to provide EOL results per each one of the at least one electrical circuit.

The EOL results may be generated by electrical testers, failure analysis tools, sorting devices and the like. The EOL results may be acquired by performing scan diagnostics.

The EOL results may include, for example, fault nets, outcome of volume diagnostics (outcome of processing of multiple results), sort, test, reliability and system level data. The EOL results may indicate of the existence of physical defects. For example—shorts, opens, and certain leakage parameters.

Stage 120 may be followed by stage 130 of correlating the EOL results to the evaluation results to provide correlation results.

The correlating may include at least one of the following:
  a. Attempting (131) to associate defects represented by the evaluation results with faults represented by the EOL results.

b. Comparing (132) between locations of out of control parameters with the defect locations in an inspection map of a specific manufacturing process stage. Every parameter that is measured during the electrical circuit manufacturing process, including the end-of-line electrical measurements, has a range that is defined as a normal range, and based on the normal range a control limit is assigned to every parameter. Once this value is crossed it triggers an 'out of control' alarm.

c. Categorizing (133) defects indicated by the evaluation results to one of the following categories:
  i. Detected fault causing defect (common).
  ii. Non-fault causing defect (adder).
  iii. Undetected fault causing defect (missing).

Stage 130 may be followed by stage 140 of responding to the correlation results.

Stage 140 may include creating multiple inspection recipes from a single fault-net, each recipe corresponding to a specific layer that is part of the fault-net. For each recipe the inspected areas within an electrical circuit will be driven from the corresponding fault-net physical layout. For example, for each recipe die that will be the selected for inspection within a wafer will be selected by based on the EOL volume-diagnostics distribution.

For example, stage 140 may include at least one out of:
  a. Evaluating (141) a quality of each recipe. Higher correlation between EOL results and evaluation results obtained by applying a certain recipe will indicate of a higher quality of the recipe.
  b. Defining (142) recipe parameters that can indicate on physical defects in the specific inspection step (for example metal one layer (M1) short in post M1 copper mechanical planarization (CMP) inspection stage).
  c. Creating (143) a unified map in a Klarf format that has all the defect locations from the inspection tool and from the EOL out-of-control data.
  d. Providing (144) a representation of one or more categories of defects. For example—provided a die layout that will define the undetected fault causing defects.
  e. Performing (145) a statistical analysis of common/adders/missing defects between defect inspection and test/sort.
  f. Performing (146) defect localization of failing cells.
  g. Formatting (147) the correlation results or the representation of the one or more categories of defects in an evaluation process compliant format. The evaluation process compliant format is compatible to an inspection system format, a review system format and/or to a metrology system format. This compatibility allows these systems to inspect/review or measure the locations of these defects.
  h. Applying (148) an optimization algorithm to define the most suitable recipe, or combination of recipes, that for example will maximize the occurrence of 'common' defects and minimize the occurrence of 'Adder' and/or 'Missing' defects
  i. Performing (149) adjustments of one or more recipes that will be used for future evaluating of electrical circuits.
  j. Adding (150) to one or more recipe an inspection step using an optical or e-beam inspection system, for example for the purpose of inspecting only areas with 'Missing' type of defects—aiming to seek for expected physical defects using high sensitivity settings
  k. Adding (151) to one or more recipe another inspection step using an optical or electron beam inspection tool, for example for the purpose of inspecting only areas with 'Common' defects—aiming to monitor fault locations that contain physical defects
  l. Adding (152) to one or more recipes a review stage, for example for the purpose of taking images from 'Missing' locations and optionally perform quantitative analysis over the images—aiming to characterize physical behavior of fault locations.
  m. Calculating (153) optimized recipe parameters.
  n. Calculating (154) a recipe for high sensitivity inspection.
  o. Calculating (155) location information for hot spot inspection.
  p. Calculating (156) location and design information for imaging review and quantitative analysis.
  q. Calculating (157) structures and location information for filtering and sampling
  r. Using (158) electrical circuit computer aided design (CAD) information to evaluate the correlation results. For example—the design data may assist in correlating between a location of a physical effect and a location of an electrical defect location.

The evaluation process compliant format may include, per each defect or suspected defect at least one out of:
  a. XY coordinates of defects or of a suspected defect.
  b. Search windows that include the XY coordinates of the defects or the suspected defects. The search window may have different shapes and/or sizes.

The search windows may correspond to the shape and size of review system frames. For example, the search windows may be rectangles formed around the XY coordinates at fixed or changing size—for example the size may range between 0.1 to 500 micron.

Yet for another example the search windows may be polygons that contain vertical and horizontal lines and form non-standard shapes (non-rectangular) and fit size requirements of any or specific review or inspection tool.

Yet for another example the search windows may be polygons that are represented by XY coordinates that will create full coverage tiling when using SEM imaging with predefined field of view, the field of view may range, for example, between 0.1 to 100 micron.

If, for example, an area to be reviewed is larger than a field of view of the review system than the area may be represented by a set of XY coordinates (all included in the area), the set of XY coordinates defined a set of search windows that once viewed will cause the review system to image the entire area.

Figure 2:
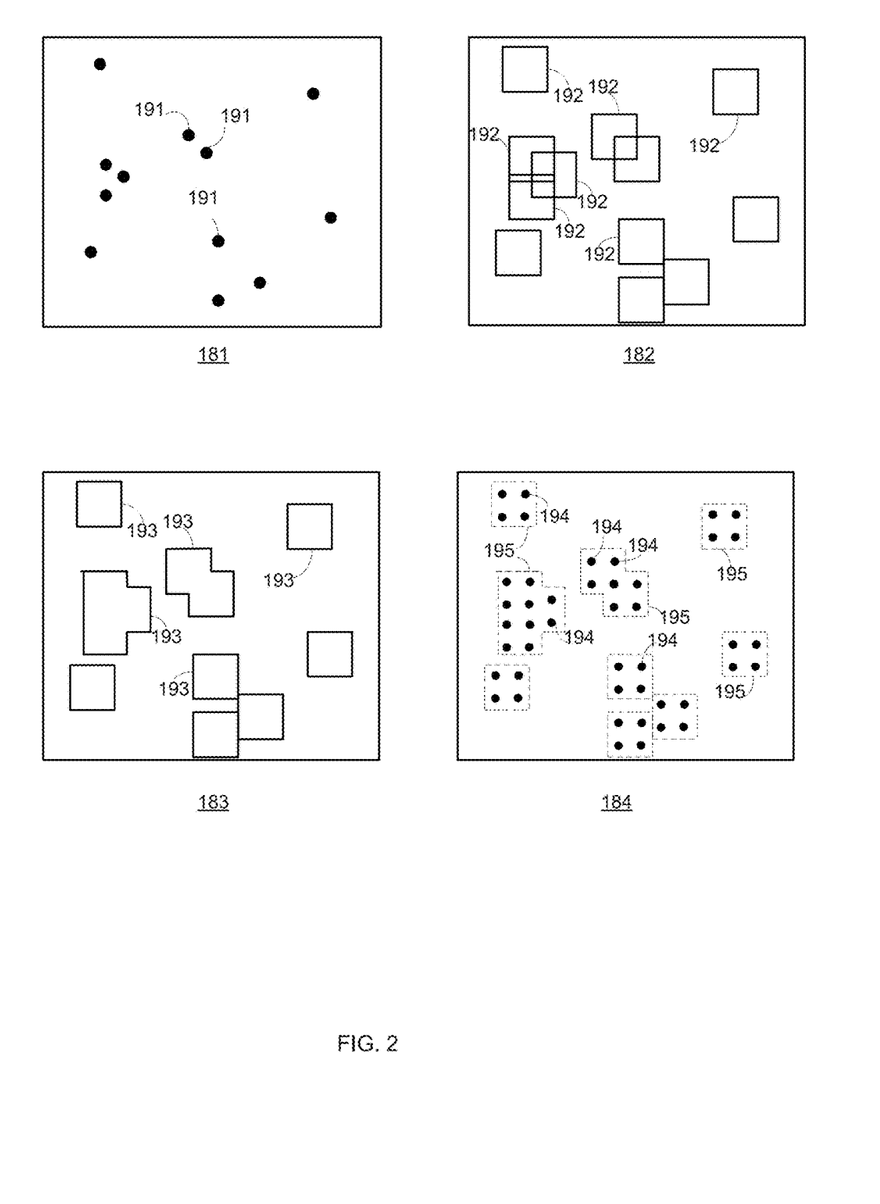
FIG. 2 illustrates various examples of defect maps of an evaluation process compliant format according to various embodiments of the invention.

FIG. 2 illustrates various examples of defect maps 181, 182, 183 and 184 of an evaluation process compliant format according to various embodiments of the invention.

Defect map 181 includes only the XY coordinates 191 of suspected defects.

Defect map 182 includes rectangular search windows 192 that are centered about the XY coordinates of suspected defects.

Defect map 183 includes polygon search windows 193 that include the XY coordinates of suspected defects. Some of the polygon search windows are rectangular and some are not rectangular.

Defect map 184 includes sets of XY coordinates 194. Each set of XY coordinates includes four XY coordinates that are arranged as rectangular arrays that once images causes the review system to "cover" polygon shaped areas 195 that exceeds the single field of view of the review system.

Figure 3:
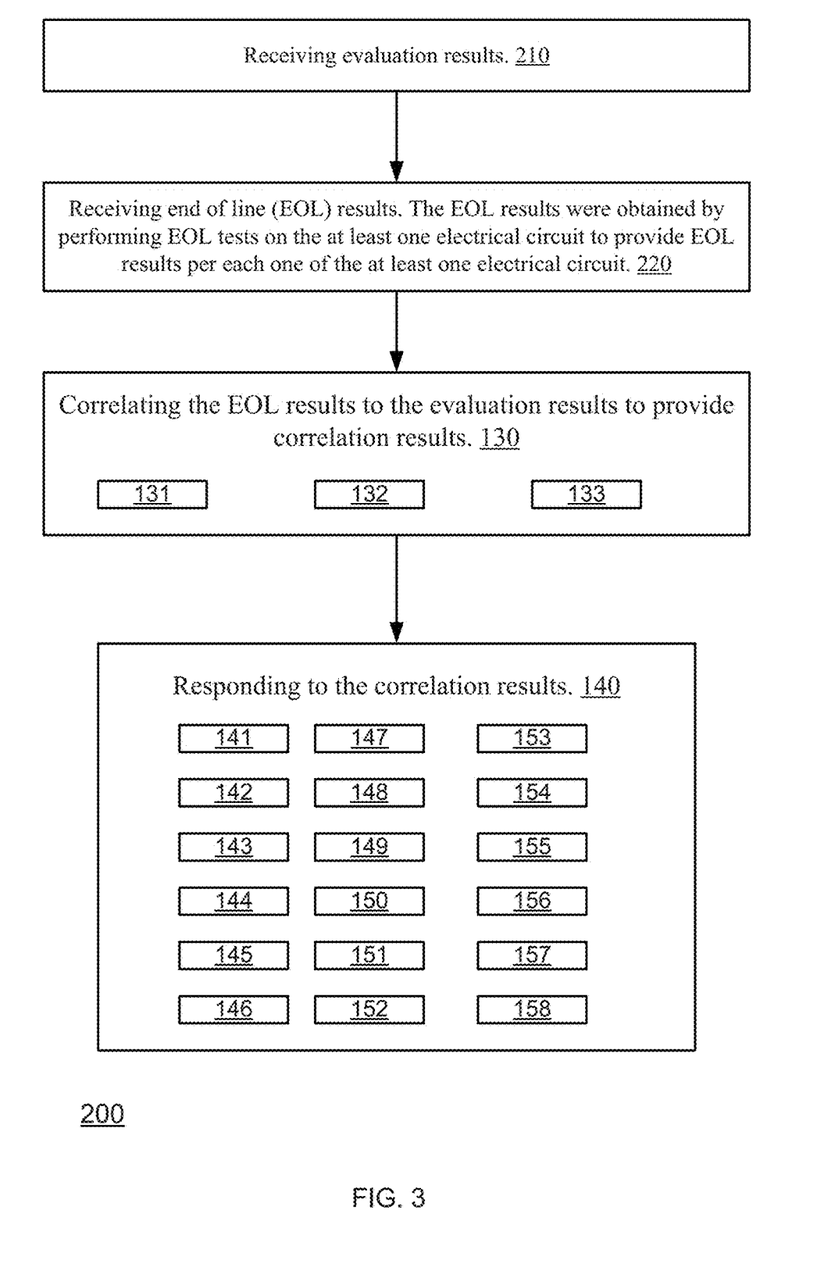
FIG. 3 illustrates a method according to an embodiment of the invention.

FIG. 3 illustrates method 200 according to an embodiment of the invention.

Method 200 may start by stages 210 and 220.

Stage 210 may include receiving evaluation results. The evaluation results were obtained by evaluating at least one electrical circuit during a manufacturing process of the at least one electrical circuit and before a completion of the manufacturing processes of the at least one electrical circuit. The evaluating does not include end of line tests of the at least one electrical circuit.

Stage 220 may include receiving end of line (EOL) results. The EOL results were obtained by performing EOL tests on the at least one electrical circuit to provide EOL results per each one of the at least one electrical circuit.

Stages 210 and 220 are followed by stage 130 of correlating the EOL results to the evaluation results to provide correlation results.

Stage 130 may be followed by stage 140 of responding to the correlation results.

Figure 4:
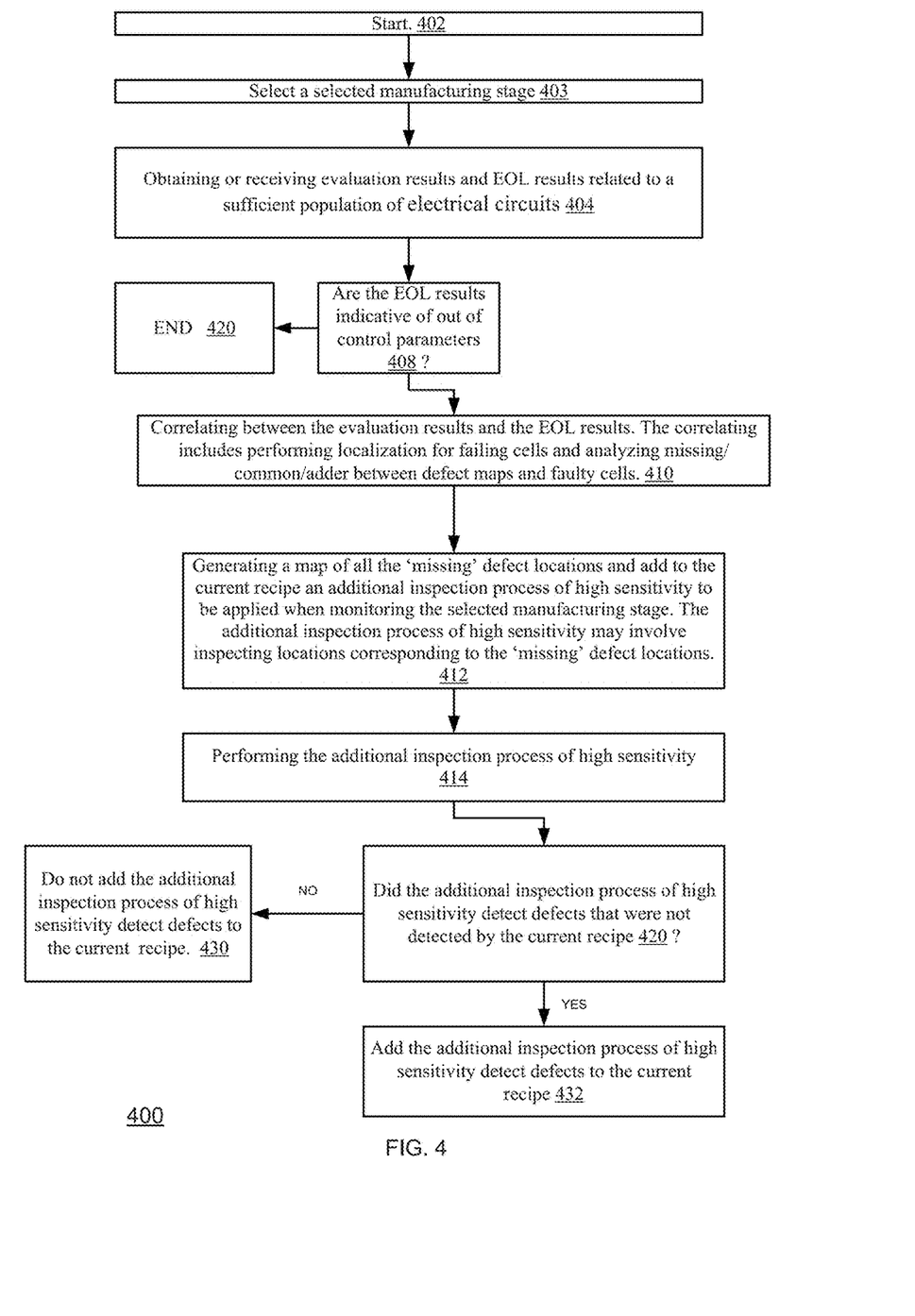
FIG. 4 illustrates a method according to an embodiment of the invention.

FIG. 4 illustrates a method 400 according to an embodiment of the invention.

Method 400 may start by stage 402 "START". This stage may be executed when a new electrical circuit is being manufactured or whenever it is determined to execute method 400.

Stage 402 may be followed by stage 403 of selecting a selected manufacturing stage. The current recipe that should be applied when monitoring the selected manufacturing stage is to be checked during the following stages of method 400. The evaluation of current recipes of multiple manufacturing stages required multiple repetitions of stages 404, 408, 410, 412, 414, 420, 430 and 432.

Stage 403 may be followed by stage 404 of obtaining or receiving evaluation results and EOL results related to a sufficient population of electrical circuits. The sufficient population of electrical circuits may include multiple electrical circuits from multiple lots. The sufficient population of electrical circuits may be defined in advance by a user but may be updated either by the user or automatically.

Stage 404 may be followed by stage 408 of checking if the EOL results are indicative of out of control parameters. If not—there is no need to update the current recipe and the method ends (as indicated by END stage 420).

If the EOL results are indicative of out of control parameters then stage 408 may be followed by stage 410 of correlating between the evaluation results and the EOL results. The correlating may include performing localization for failing cells and analyzing missing/common/adder defects between defect maps and faulty cells.

Stage 410 may be followed by stage 412 of generating a map of all the 'missing' defect locations and add to the current recipe an additional inspection process of high sensitivity to be applied when monitoring the selected manufacturing stage. The additional inspection process of high sensitivity may involve inspecting locations corresponding to the 'missing' defect locations.

Stage 412 may be followed by stage 414 of performing the additional inspection process of high sensitivity.

Stage 414 may be followed by stage 420 of checking whether the additional inspection process of high sensitivity detects defects that were not detected by the current recipe If the answer is YES—jumping to stage 432 of adding the additional inspection process of high sensitivity to the current recipe.

If the answer is NO—jumping to stage 430 of determining not to add the additional inspection process of high sensitivity to the current recipe.

Figure 5:
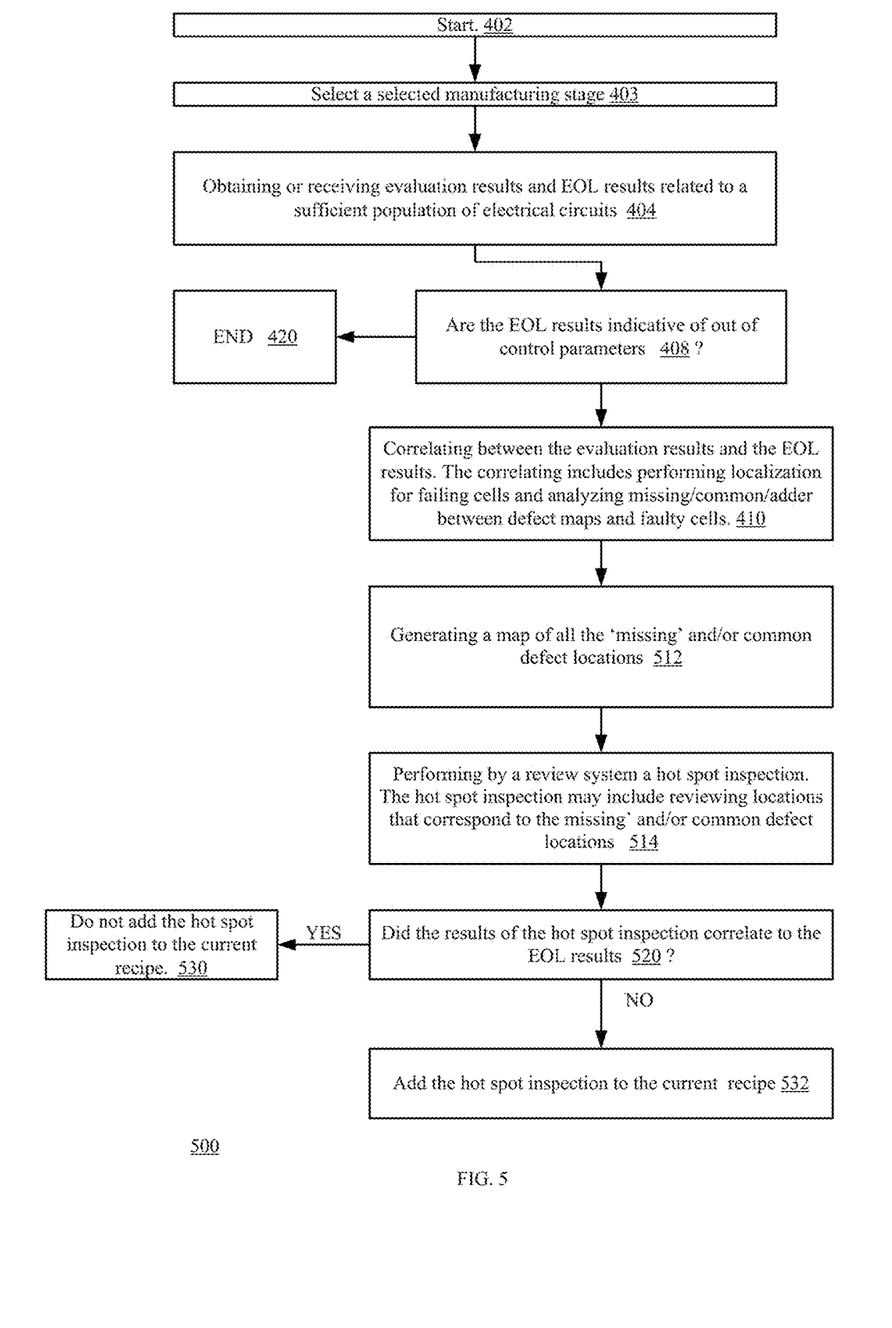
FIG. 5 illustrates a method according to an embodiment of the invention.

FIG. 4 illustrates a method 500 according to an embodiment of the invention.

Method 500 may start by stage 402 "START". This stage may be executed when a new electrical circuit is being manufactured or whenever a user wishes to start method 500.

Stage 402 may be followed of stage 403 of selecting a selected manufacturing stage. The current recipe that should be applied when monitoring the selected manufacturing stage is to be checked during the following stages of method 500. The evaluation of current recipes of multiple manufacturing stages required multiple repetitions of stages 404, 408, 410, 512, 514, 520, 530 and 532.

Stage 402 may be followed by stage 404 of obtaining or receiving evaluation results and EOL results related to a sufficient population of electrical circuits. The sufficient population of electrical circuits may include multiple electrical circuits from multiple lots. The sufficient population of electrical circuits may be defined in advance by a user but may be updated either by the user or automatically.

Stage 404 may be followed by stage 408 of checking if the EOL results are indicative of out of control parameters. If not—there is no need to update the current recipe and the method ends (as indicated by stage 420—denoted "END").

If the EOL results are indicative of out of control parameters then stage 408 may be followed by stage 410 of correlating between the evaluation results and the EOL results. The correlating may include performing localization for failing cells and analyzing missing/common/adder defects between defect maps and faulty cells.

Stage 410 may be followed by stage 512 of generating a map of all the 'missing' and/or common defect locations.

Stage 512 may be followed by stage 514 of performing by a review system a hot spot inspection. The hot spot inspection may include reviewing locations that correspond to the missing' and/or common defect locations.

Stage 515 may be followed by stage 520 of checking whether the results of the hot spot inspection correlate to the EOL results.

If the answer is YES—jumping to stage 532 of adding the hot spot inspection to the current recipe.

If the answer is NO—jumping to stage 530 of determining not to add the hot spot inspection to the current recipe.

Figure 6:
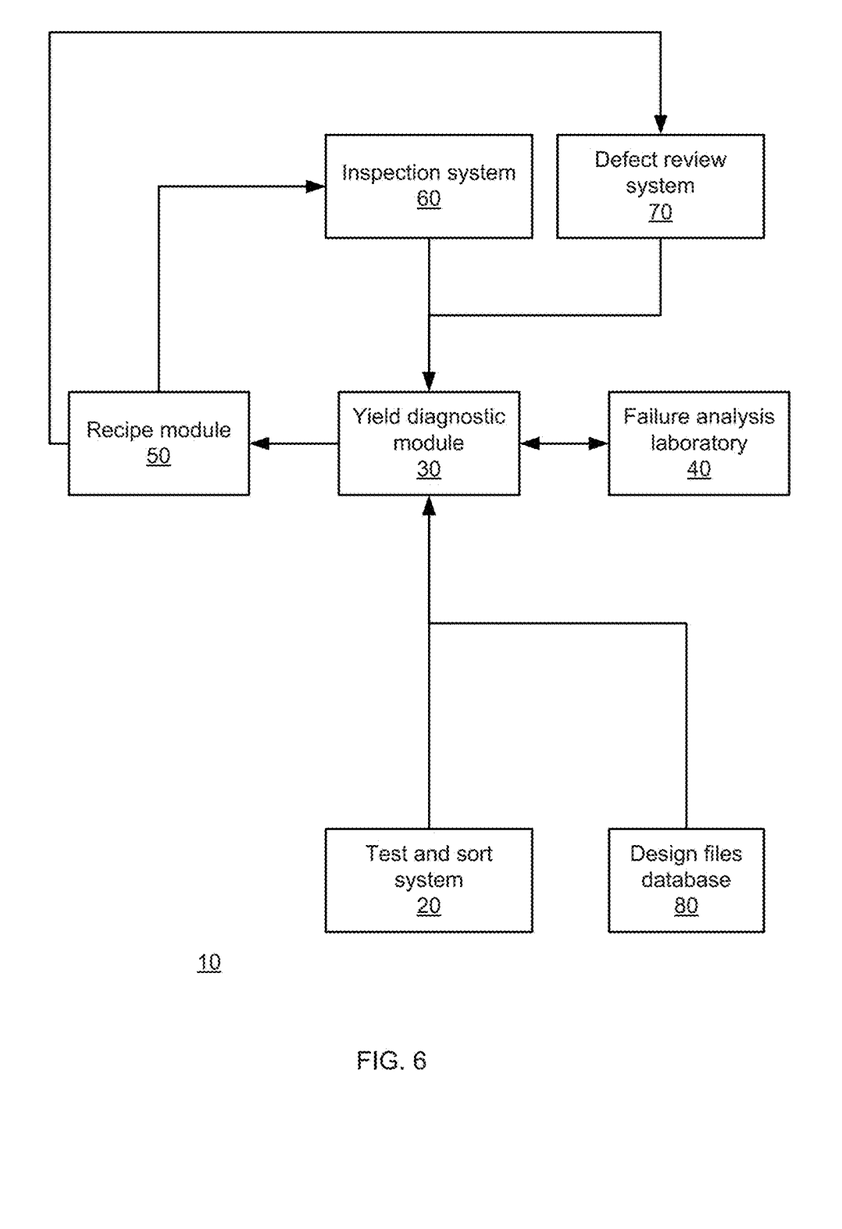
FIG. 6 illustrates a recipe module and its environment according to an embodiment of the invention.

FIG. 6 illustrates a recipe module 50 and its environment 10 according to an embodiment of the invention.

The environment 10 includes evaluation systems such as electrical circuit inspection system 60 and defect review system 70, a yield diagnostic module 30, a failure analysis laboratory 40, test and sort system 20 and design files database 80.

Evaluation results may be generated by the electrical circuit inspection system 60 and the defect review system 70 and be sent to the yield diagnostic module 30.

EOL results are generated by test and sort system 20 and are set to yield diagnostic module 30. EOL results may also be provided to the yield diagnostic module 30 by the failure analysis laboratory.

The yield diagnostic module 30 may be arranged to access design data stored in design files database 80. Design data provides the physical layout representation of the electrical connectivity, hence the possible physical location of a physical defect causing an electrical fault.

The yield diagnostic module 30 may be arranged to correlate the EOL results to the evaluation results to provide correlation results.

The yield diagnostic module 30 may be arranged to correlate the EOL results to the evaluation results to provide correlation results. The correlation results may be set to the recipe module 50. The recipe module 50 may determine recipes of the electrical circuit inspection system 60 and/or the defect review system 70 in response to the correlation results.

Environment and recipe module may execute method 100 and 200. For example, stage 110 may be executed by electrical circuit inspection system 60 and defect review system 70. Stage 120 may be executed by test and sort system 20. Stages 130, 210 and 220 may be executed by yield diagnostic module 30. Stage 140 may be executed by recipe module 50.

Figure 7:
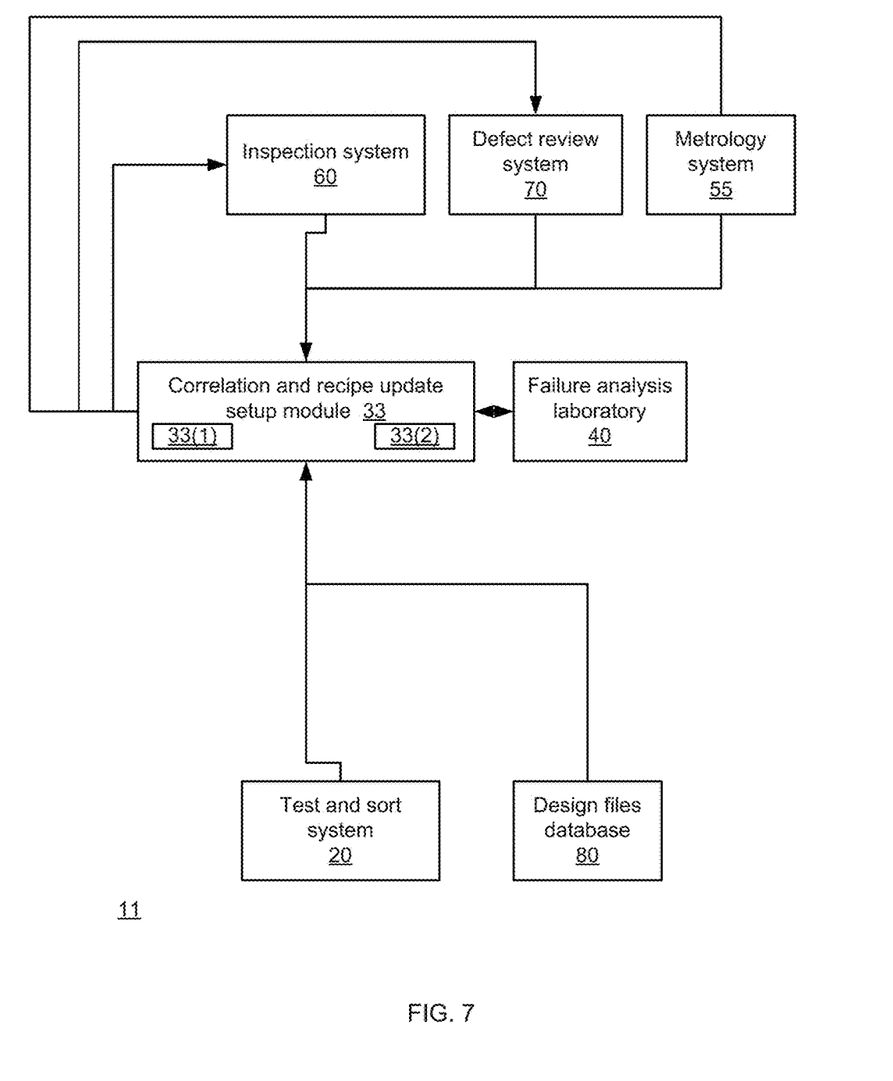
FIG. 7 illustrates a correlation and recipe module and its environment according to an embodiment of the invention.

FIG. 7 illustrates a correlation and recipe module 33 and its environment 11 according to an embodiment of the invention.

According to an embodiment of the invention the yield diagnostic module and the recipe module of FIG. 6 may be integrated to provide a single system such as correlation and recipe module 33 of FIG. 7. The correlation and recipe module 33 may include a yield diagnostic module 33(1) and a recipe module 33(2). Each module may include one or more processors, one or more computer and the like.

The correlation and recipe module 33 may be arranged to execute stages 130, 140, 210 and 220.

The correlation and recipe module 33 may be arranged to receive evaluation information from metrology system 55 and design information from design file database 80.

Figure 8:
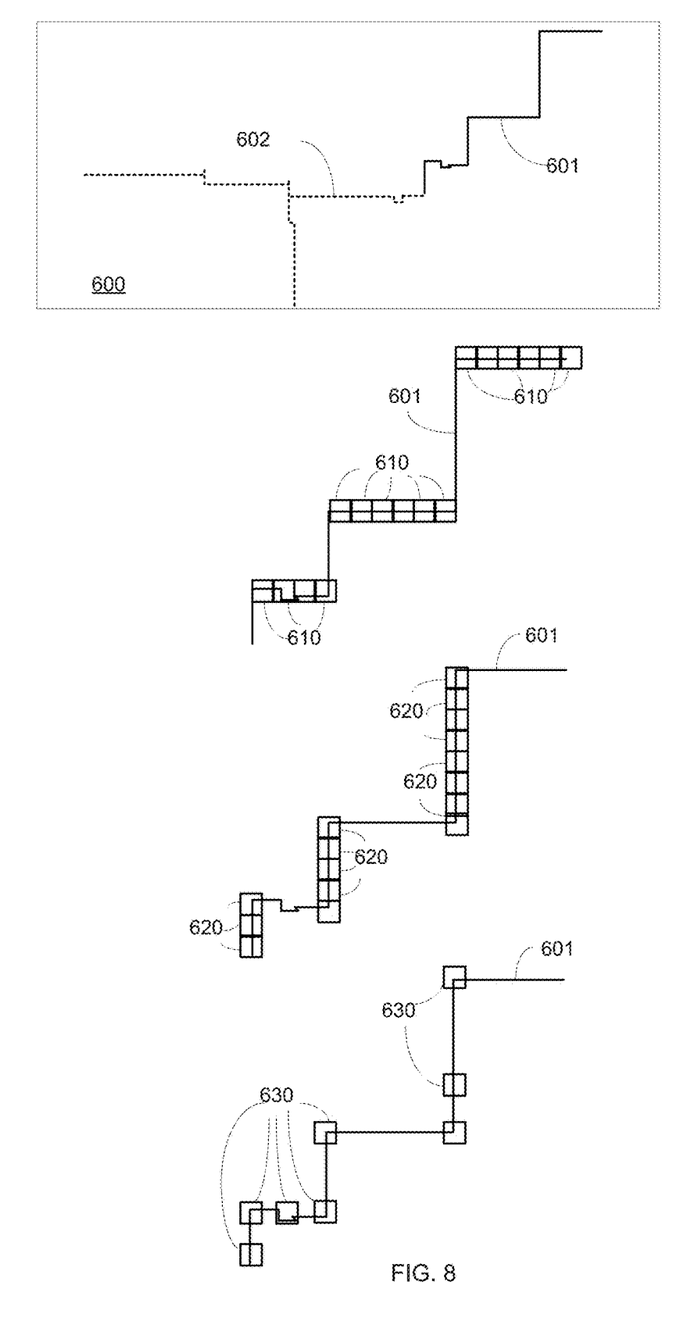
FIGS. 8-9 illustrate examples of EOL results and changes introduced in evaluation recipes according to various embodiments of the invention.
Figure 9:
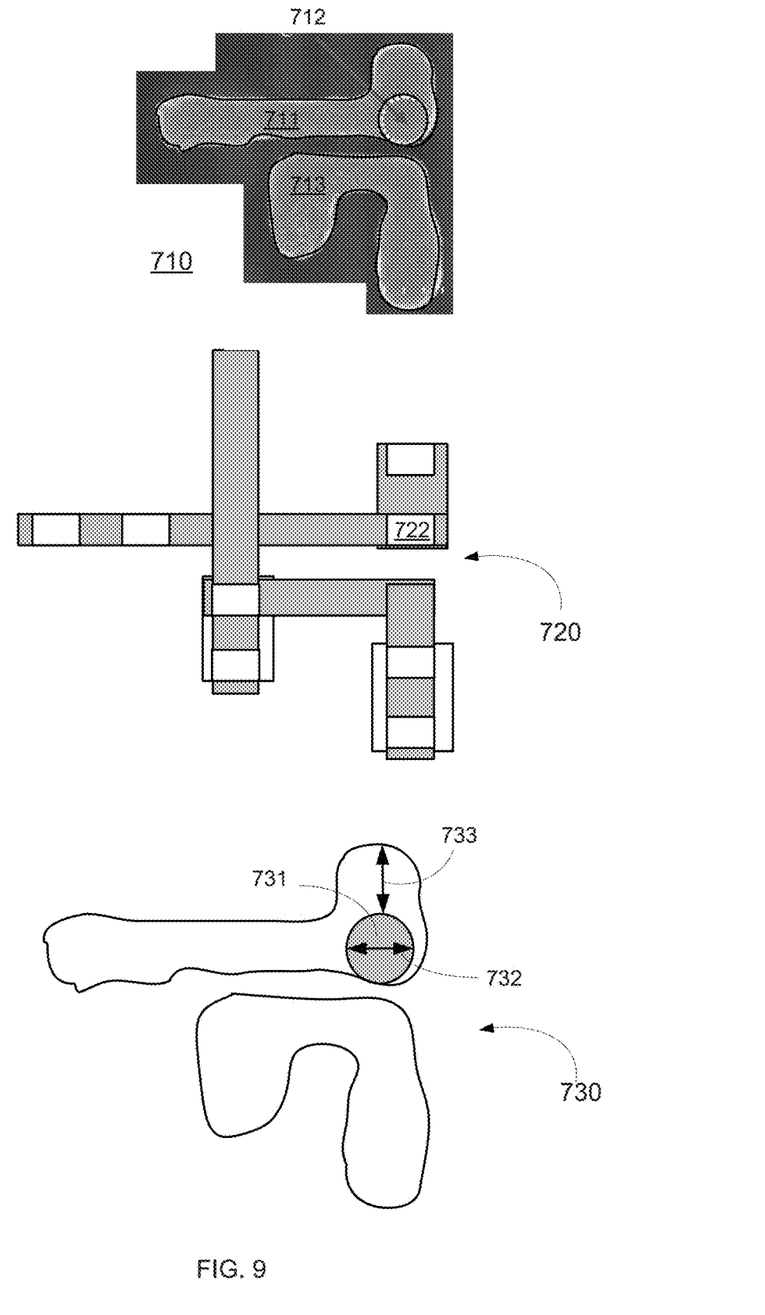

FIGS. 8 and 9 illustrates examples of EOL results and changes introduced in evaluation recipes according to various embodiments of the invention.

FIG. 8 illustrates a conversion of a fault-net from EOL volume-diagnostic analysis into defect inspection or defect review recipe. The outcome of an EOL volume diagnostic indicates that area 600 of a die includes a proper conductive path 602 and a faulty conductive path 601.

The faulty conductive path 601 (as indicated by design information and/or by the outcome of an EOL volume diagnostic) includes conductors of a first metal layer (M1), vias (V1) and conductors of a second metal layer (M2).

Accordingly, an evaluation recipe (review recipe and/or an inspection recipe) is provided and includes instructions for imaging areas corresponding to area 600 (located at the same location within an electrical circuit).

A recipe module or a recipe server defines search windows 610 in an evaluation recipe for first metal layer that "cover" conductors of the first metal layer that belong to the faulty conductive path 601.

A recipe module or a recipe server defines search windows 620 in an evaluation recipe for second metal layer that "cover" conductors of the second metal layer that belong to the faulty conductive path 601.

A recipe module or a recipe server defines search windows 630 in an evaluation recipe for first via layer that "cover" conductors of the first via layer that belong to the faulty conductive path 601.

FIG. 9 illustrates an image 710 of a defective via 711 and its surroundings, design data 720 related to the defective die and its surroundings and various measurements to be included in a metrology recipe of a metrology system according to an embodiment of the invention.

Image 710 includes a defective via 711. This via was found to be repetitively defected in multiple dies—as indicated by EOL volume diagnostics. The recipe module or recipe module defined a metrology recipe that include measurements of the area (731) of the via, of the length and/or width (732) of the via, of distances between the via and one or more edges of a conductor (for example distance 733), and/or for differences between the actual via dimensions and/or distances and between design data about the via dimensions and/or the distances.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for evaluating a recipe used to evaluate a plurality of electrical circuits that include microscopic structural elements, the method executed by a computerized system and comprising:
   generating or receiving, at a computer system, evaluation results that are indicative of an outcome of an evaluation process of at least one manufacturing stage of at least one electrical circuit in the plurality of electrical circuits, wherein the evaluation results differ from end of line (EOL) results and include a plurality of results generated from evaluation processes that differ from each other by one or more setup parameters;
   receiving or generating, at the computer system, EOL results relating to the at least one electrical circuit and that indicate the existence of one or more physical defects of the at least one electrical circuit;

correlating, at the computer system, the evaluation results and the EOL results to provide correlation results; and determining, at the computer system, whether to alter the recipe in response to the correlation results and, if it is determined to alter the recipe, altering the recipe and using the altered recipe in future processes for evaluating a plurality of electrical circuits that include microscopic elements.

2. The method according to claim 1 wherein the correlating comprises categorizing defects to one of the following categories: detected fault-causing defect, non-fault-causing defects and undetected fault-causing defects.

3. The method according to claim 2 comprising altering the recipe in response to the categorizing of defects.

4. The method according to claim 2 comprising altering the recipe to include an evaluation of locations that correspond to locations of undetected fault causing defects.

5. The method according to claim 2 comprising altering the recipe to include an evaluation of locations that correspond to locations of detected fault causing defect.

6. The method according to claim 2 comprising adding to the recipe of a scanning electron microscopy review of locations that correspond to locations of at least one category of defect.

7. The method according to claim 1 comprising adding to the recipe a hot spot inspection.

8. The method according to claim 1 comprising retrieving design data about the electrical circuit and evaluating the correlation results in response to the design data.

9. A non-transitory computer readable medium that stores instructions that once executed by a computerized system cause the computerized system to execute the stages of:

generating or receiving evaluation results that are indicative of an outcome of an evaluation process of at least one manufacturing stage of at least one electrical circuit; wherein the evaluation results differ from end of line (EOL) results and include a plurality of results generated from evaluation processes that differ from each other by one or more setup parameters;

receiving or generating EOL results relating to the at least one electrical circuit and that indicate the existence of one or more physical defects of the at least one electrical circuit;

correlating the evaluation results and the EOL results to provide correlation results; and determining, at the computer system, whether to alter the recipe in response to the correlation results and, if it is determined to alter the recipe altering the recipe and using the altered recipe in future processes for evaluating a plurality of electrical circuits.

10. The non-transitory computer readable medium according to claim 9 wherein the correlating comprises categorizing defects to one of the following categories:

detected fault-causing defect, non-fault-causing defects, and undetected fault-causing defects.

11. The non-transitory computer readable medium according to claim 10 that stores instructions for altering the recipe in response to the categorizing of defects.

12. The non-transitory computer readable medium according to claim 10 that stores instructions for altering the recipe to include an evaluation of locations that correspond to locations of undetected fault causing defects.

13. The non-transitory computer readable medium according to claim 10 that stores instructions for altering the recipe to include an evaluation of locations that correspond to locations of detected fault causing defect.

14. The non-transitory computer readable medium according to claim 10 that stores instructions for adding to the recipe of a scanning electron microscopy review of locations that correspond to locations of at least one category of defect.

15. A computerized system comprising:

a yield diagnostics module configured to generate, from an evaluation recipe, evaluation results that are indicative of an outcome of an evaluation process of at least one manufacturing stage of at least one electrical circuit in the plurality of electrical circuits, wherein the evaluation results differ from end of line (EOL) results and include a plurality of results generated from evaluation processes that differ from each other by one or more setup parameters; and a recipe module configured to: (i) receive EOL results relating to the at least one electrical circuit and that indicate the existence of one or more physical defects of the at least one electrical circuit, (ii) receive the evaluation results relating to the at least one electrical circuit; (iii) correlate the evaluation results and the EOL results to provide correlation results; and (iv) determine whether to alter the recipe in response to the correlation results and, if it is determined to alter the recipe, altering the recipe and using the altered recipe in future processes for evaluating a plurality of electrical circuits that include microscopic elements.

* * * * *